(12) United States Patent
Hwang et al.

(10) Patent No.: US 7,720,441 B2
(45) Date of Patent: May 18, 2010

(54) APPARATUS AND METHOD FOR MINIMIZING INTER-SIGNAL INTERFERENCE IN A WIRELESS COMMUNICATION SYSTEM

(75) Inventors: Sung-Soo Hwang, Suwon-si (KR); Young-Hoon Kwon, Seongnam-si (KR); Won-Kyun Suk, Seoul (KR)

(73) Assignee: Samsung Electornics Co., Ltd. (KR)

( * ) Notice: Subject to any disclaimer, the term of this patent is extended or adjusted under 35 U.S.C. 154(b) by 879 days.

(21) Appl. No.: 11/527,178

(22) Filed: Sep. 26, 2006

(65) Prior Publication Data

US 2007/0080868 A1    Apr. 12, 2007

(30) Foreign Application Priority Data

Sep. 27, 2005    (KR) ..................... 10-2005-0090151

(51) Int. Cl.
*H04B 1/00*    (2006.01)
*H04B 15/00*    (2006.01)
*H04B 17/00*    (2006.01)

(52) U.S. Cl. ................. 455/63.1; 455/67.11; 455/67.16

(58) Field of Classification Search ................ 455/63.1, 455/67.11, 67.13, 67.16, 42, 501, 296, 304, 455/23, 139, 205, 276.1
See application file for complete search history.

(56) References Cited

U.S. PATENT DOCUMENTS 6,889,061 B2 *    5/2005    Shapira et al.    ........... 455/562.1

FOREIGN PATENT DOCUMENTS

| EP | 1 307 066 | 5/2003 |
| JP | 09-298766 | 11/1997 |
| JP | 2001-308782 | 11/2001 |
| KR | 1020010003097 | 1/2001 |
| KR | 1020040052064 | 6/2004 |

* cited by examiner

*Primary Examiner*—Eugene Yun
(74) *Attorney, Agent, or Firm*—The Ferrell Law Firm, LLP

(57) ABSTRACT

An apparatus and method for minimizing inter-signal interference in a wireless communication system are provided. The polarization phases of Mobile Stations (MSs) are measured. An MS group including a predetermined number of MSs is determined and a polarization phase of the MS group is compensated. The polarization phase of a transmission signal is matched to the compensated polarization phase and the matched signal is sent to the MS group.

29 Claims, 8 Drawing Sheets

APPARATUS AND METHOD FOR MINIMIZING INTER-SIGNAL INTERFERENCE IN A WIRELESS COMMUNICATION SYSTEM

PRIORITY

This application claims priority under 35 U.S.C. §119 to an application filed in the Korean Intellectual Property Office on Sep. 27, 2005 and assigned Serial No. 2005-90151, the contents of which are incorporated herein by reference.

BACKGROUND OF THE INVENTION

1. Field of the Invention

The present invention relates generally to signal transmission in a wireless communication system, and in particular, to an apparatus and method for minimizing inter-signal interference in a wireless communication system.

2. Description of the Related Art

In the field of wireless communications, new communication systems have recently been developed and new frequency bands have been allocated. Also, new technologies have emerged to achieve miniaturization and digitization beyond conventional analog wireless communication schemes. The significance of such wireless communication systems is increasing in view of the nature of free propagation of waves in the air.

Due to the feature of a wireless propagation path, a wireless communication system can adopt a variety of signal transmission schemes. Among them, there is a polarization-based signal transmission scheme. Polarization is a property that the direction and magnitude of an oscillated electric field is related to a predetermined direction in electromagnetic propagation. Now a description will be made of a wireless communication system utilizing polarization, starting with electric propagation.

FIG. 1 shows propagation of electric waves in a typical wireless communication system. The phase of electric waves is propagated across space according to the polarization of an antenna. Assuming that the electric field E of the electric waves is propagated in a z-axis direction, the x-y plane electric field E denoted by reference numeral 101 at a predetermined position has an x-axis electric field $E_x$, a y-axis electric field $E_y$, and a particular polarization phase θ. The electric field 101 is determined according to the polarization of the antenna, the spatial position of the antenna, and reflection and diffraction in surroundings.

If a receive antenna is polarized with a predetermined phase, it has a maximum reception power when receiving waves polarized with the polarization phase. Therefore, the polarization can be utilized to increase efficiency by distinguishing an intended wave or adjusting the polarization angle of a transmit/receive antenna in the wireless communication system using antennas. Although a random polarization phase is propagated instantaneously due to a phase delay caused by the polarization phase θ of the transmit antenna, and reflection and diffraction from a surrounding object, the average reception power measured for a predetermined period reveals that electric waves are propagated and polarized constantly irrespective of frequency or the velocity of a receiver. Polarization-based signal transmission and reception will be described with reference to FIG. 2.

FIG. 2 shows polarization-based signal transmission and reception in a typical wireless communication system. A Base Station (BS) 200 includes first and second polarization antennas 201 and 203, for polarization-based signal transmission, and Mobile Stations (MSs) 230 and 260 receive signals based on polarization.

The first and second polarization antennas 201 and 203 are perpendicular to each other. The BS 200 communicates with the MSs 230 and 260 based on the above-described polarization property. Thus, the MSs 230 and 260 receive signals from the polarization antennas 201 and 203 of the BS 200 through antennas with predetermined polarization phases.

For example, on the downlink, the polarization antennas 201 and 203 send transmission polarization phases in accordance with the received polarization phases of the MSs 230 and 260. The MSs 230 and 260 have a maximum reception power, for communications with the BS 200.

If the polarization difference between two users is adjusted to be orthogonal, as shown in FIG. 2, each polarization has no effect on the other polarization. Thus, it is possible to provide a service to the two users simultaneously.

This polarization-based signal transmission scheme is efficient to a communication system relying on point-to-point communication or using two terminals with orthogonal reception polarization phases. However, if the communication system services two or more users, transmitted/received signals interfere with one another. The inter-signal interference with MSs will be described with reference to FIG. 3.

FIG. 3 shows the polarization phase of each MS in a typical wireless communication system using polarization. A first MS (MS 1) has a polarization phase 301 and a second MS (MS 2) has a polarization phase 303. When the BS sends a signal with the polarization phase 301 to MS 1, part of the polarized signal acts as an interference component 305 to the polarization phase 303 of MS 2.

A polarization phase varies with the polarization phase of an antenna at an MS and an environment, even if it is the average of polarization phases measured for a long time. As a consequence, there may exist no MSs having mutually orthogonal polarization phases, resulting in interference. Inter-signal interference is one obstacle to signal restitution. Accordingly, a need exists for solving the inter-signal interference problem.

SUMMARY OF THE INVENTION

An object of the present invention is to substantially solve at least the above problems and/or disadvantages and to provide at least the advantages below. Accordingly, the present invention provides an apparatus and method for minimizing inter-signal interference in a wireless communication system.

The present invention provides an apparatus and method for minimizing inter-signal interference using polarization in a wireless communication system.

According to one aspect of the present invention, in a method of minimizing inter-signal interference in a wireless communication system, the polarization phases of MSs are measured. An MS group including a predetermined number of MSs is determined and a polarization phase of the MS group is compensated. The polarization phase of a transmission signal is matched to the compensated polarization phase and the matched signal is sent to the MS group.

According to another aspect of the present invention, in an apparatus for minimizing inter-signal interference in a wireless communication system, a polarization phase measurer measures the polarization phases of MSs. A decider determines an MS group including a predetermined number of MSs. A polarization phase compensator compensates a polarization phase of the MS group. A polarization phase matcher matches a polarization phase of a transmission signal to the compensated polarization phase.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for sending signals, minimizing interference between Mobile Stations (MSs) in a wireless communication system. Specifically, the polarization phases of MSs are measured and an MS group is set which includes a predetermined number of MSs. Polarization phase compensation is performed for the MS group and the polarization phase of a transmission signal is matched to a compensated polarization phase. In this way, the Base Station (BS) communicates with the MS group. The MS group includes one or two MSs.

Each MS reports its current channel quality by, for example, a Signal-to-Noise Ratio (SNR) a Carrier-to-Interference Ratio (CIR), a Signal-to-Interference Noise Ratio (SINR) or a Carrier-to-Interference Noise Ratio (CINR). The BS selects an MS group with the best channels and allocates channels to the MS group.

Figure 1:
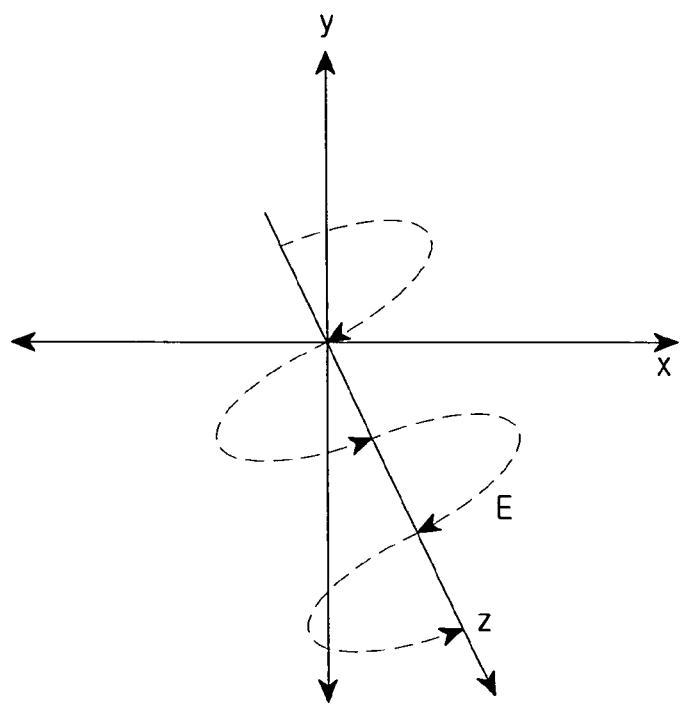
FIG. 1 illustrates electric propagation in a typical wireless communication system.
Figure 1:
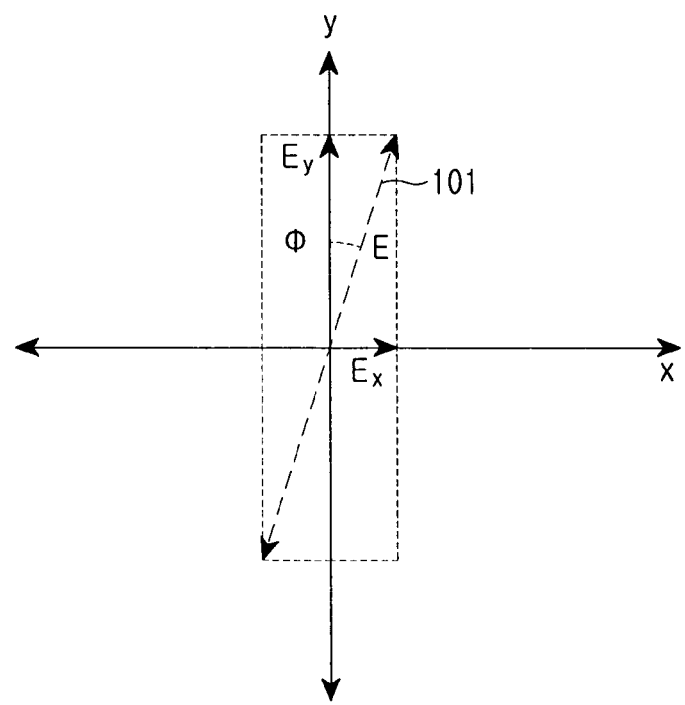
Figure 2:
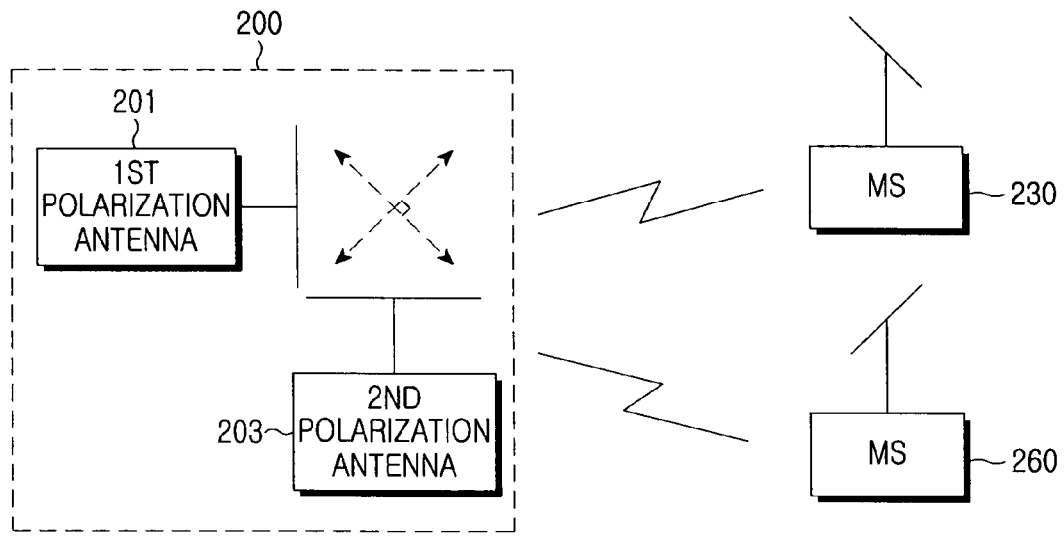
FIG. 2 illustrates polarization-based signal transmission and reception in a wireless communication system.
Figure 3:
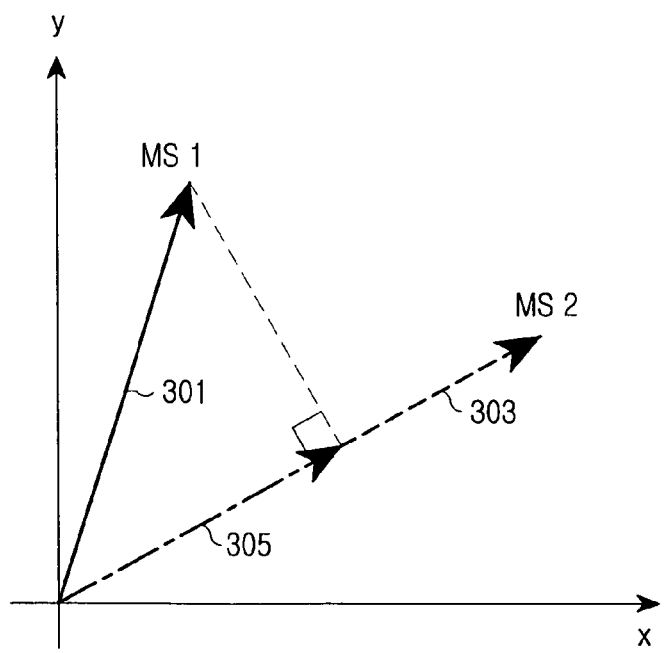
FIG. 3 illustrates the polarization phase of each MS in a typical wireless communication system using polarization.
Figure 4:
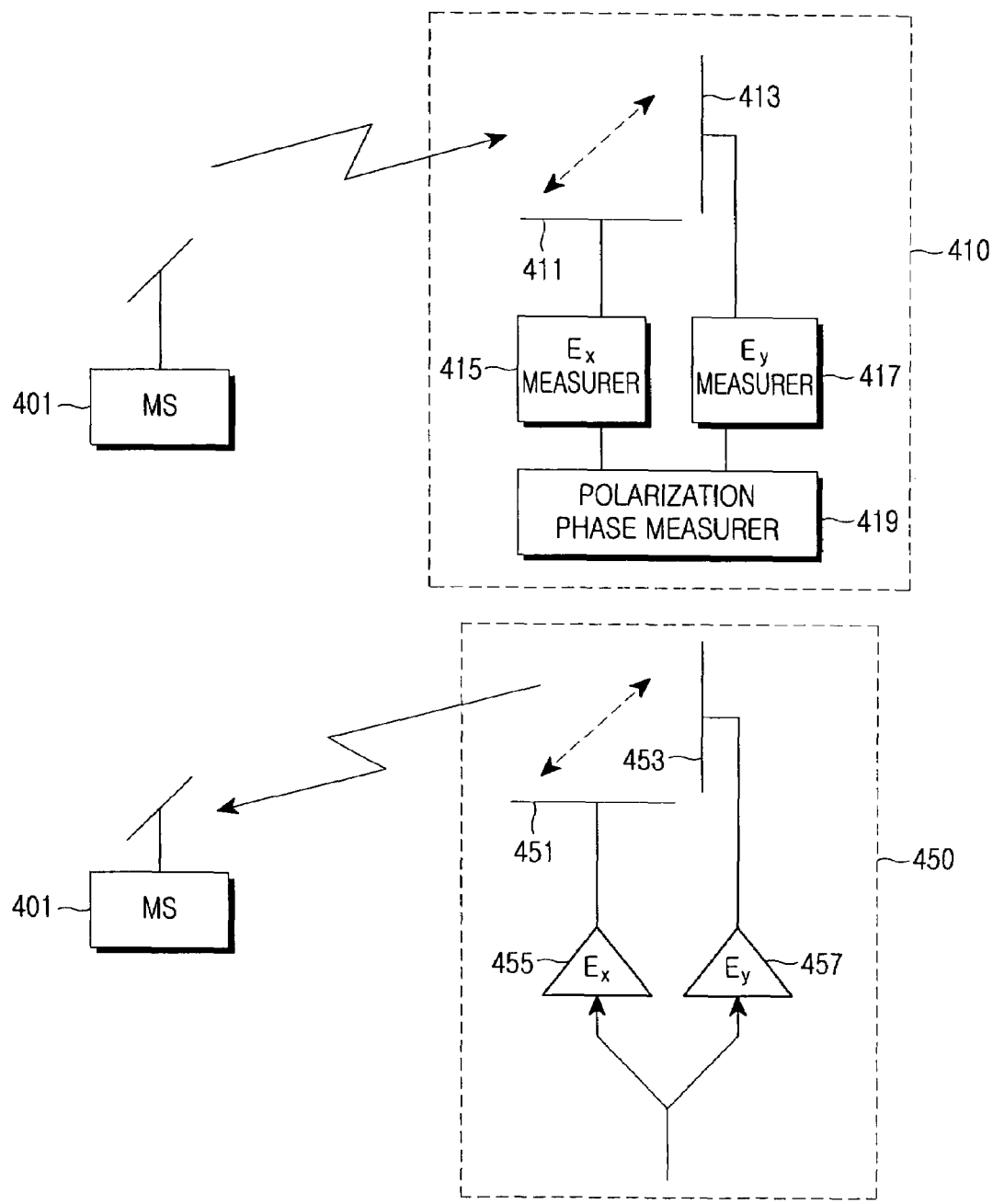
FIG. 4 is a block diagram of a transmitter and a receiver in a BS operating based on polarization in the wireless communication system.

With reference to FIG. 4, a description will be made below of the structures of a transmitter and receiver for sending and receiving signals based on polarization in a BS. The BS includes a receiver 410 and a transmitter 450. The receiver includes two orthogonal receive polarization antennas 411 and 413, electric field measurers for measuring the electric fields $E_x$ and $E_y$ received at the receive polarization antennas 411 and 413, i.e. an $E_x$ measurer 415 and an $E_y$ measurer 417, and a polarization phase measurer 419.

The two receive polarization antennas 411 and 413 receive uplink electric fields from an MS 401. Specifically, the x-axis polarization antenna 411 receives an x-axis electric field $E_x$ and the y-axis polarization antenna 413 receives an y-axis electric field $E_y$. The $E_x$ measurer 415 and $E_y$ measurer 417 measure the x-axis electric field $E_x$ and the y-axis electric field $E_y$, respectively. The polarization phase measurer 419 calculates a polarization phase by Equation (1)

$$\phi = \tan^{-1}\left(\frac{E_y}{E_x}\right) \quad (1)$$

After the polarization phase measuring, the BS compensates the polarization phase φ and receives a signal from the MS 401 with the compensated polarization phase φ. Therefore, the reception SNR is increased.

The transmitter includes two orthogonal transmit polarization antennas 451 and 453, and electric field polarization matchers 455 and 457 (i.e. an $E_x$ polarization matcher 455 and an $E_y$ polarization matcher 457). For downlink transmission to the MS 401, the polarization matchers 455 and 457 match electric fields $E_x$ and $E_y$ to the polarization phase φ measured by the receiver 410. The transmit polarization antennas 451 and 453 send the phase-matched electric fields $E_x$ and $E_y$ to the MS 401, thereby maximizing the reception power of the MS 401. Polarization phase compensation for minimizing inter-signal interference will be described with reference to FIG. 5.

Figure 5:
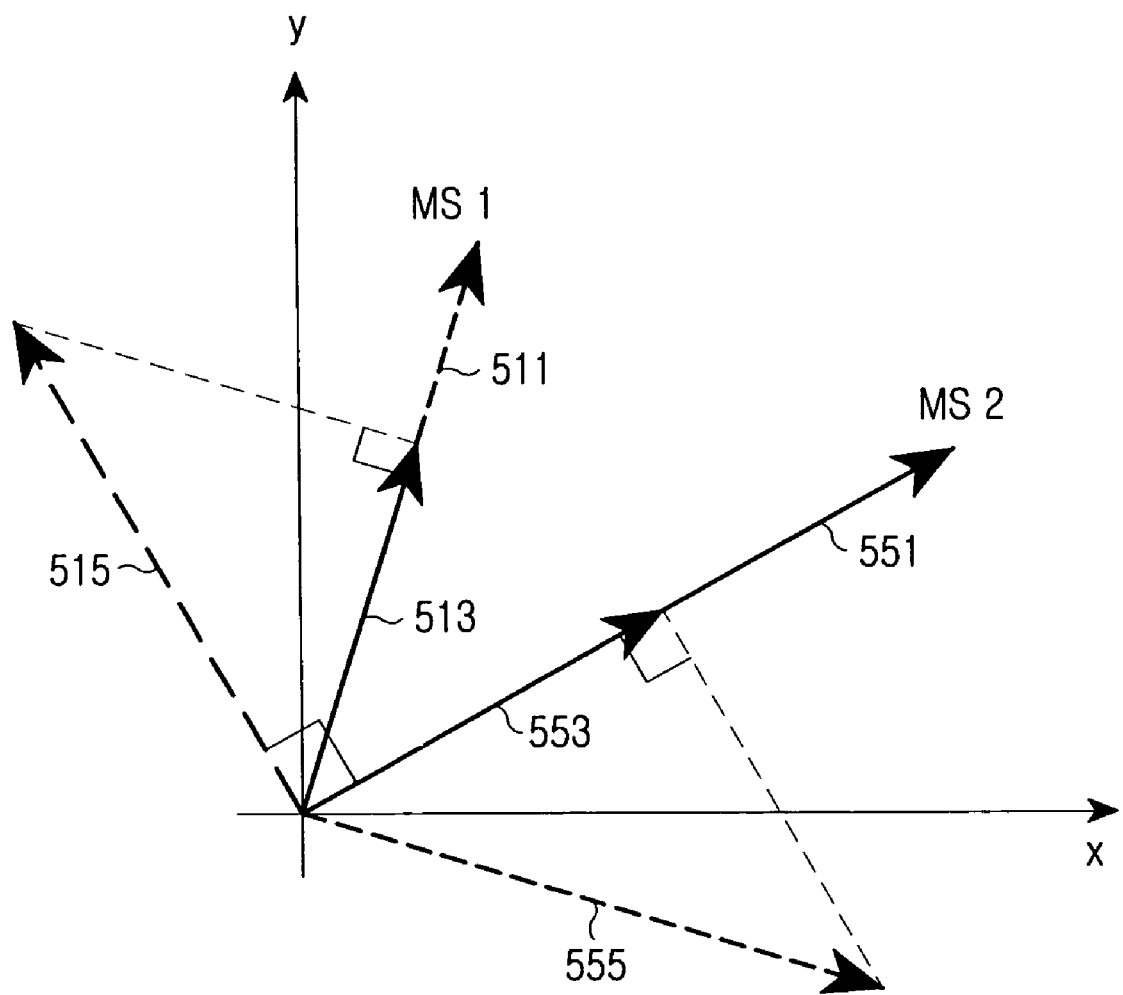
FIG. 5 illustrates polarization phase compensation in the wireless communication system according to the present invention.

FIG. 5 shows polarization phase compensation in the wireless communication system according to the present invention. For a BS, there are two MSs (MS 1 and MS 2) having a polarization phase 511 and a polarization phase 551, respectively. In downlink transmission, these polarization phases 511 and 551 are not orthogonal to each other.

As a result, as much interference as mutual projection between polarized signals occurs to signals sent to the MSs.

However, if the BS has knowledge of the polarization phases 511 and 551 of MS 1 and MS 2, it can send signals to them so that the polarization phase 511 is orthogonal to the polarization phase 551, thus avoiding the mutual interference. For this purpose, the BS compensates the polarization phase 511 and generates the compensated polarization phase 515 for MS 1 to be orthogonal to the polarization phase 551. While the reception power 513 of MS 1 is decreased by the use of the compensated polarization phase 515, the orthogonality between MS 1 and MS 2 prevents inter-signal interference for them.

On the contrary, no mutual interference occurs either when the polarization phase 551 is rendered orthogonal to the polarization phase 511. Thus, the BS compensates the polarization phase 551 of MS 2 with respect to the polarization phase 511 and generates the compensated polarization phase 555 for MS 2. The use of the polarization phase 555 decreases the reception power 553 of MS 2, but the resulting orthogonality prevents inter-signal interference for MS 1 and MS 2.

Therefore, the polarization phase of at least one MS is compensated so that polarization phases are mutually orthogonal to each other between MSs. A BS according to the present invention will be described with reference to FIG. 6.

Figure 6:
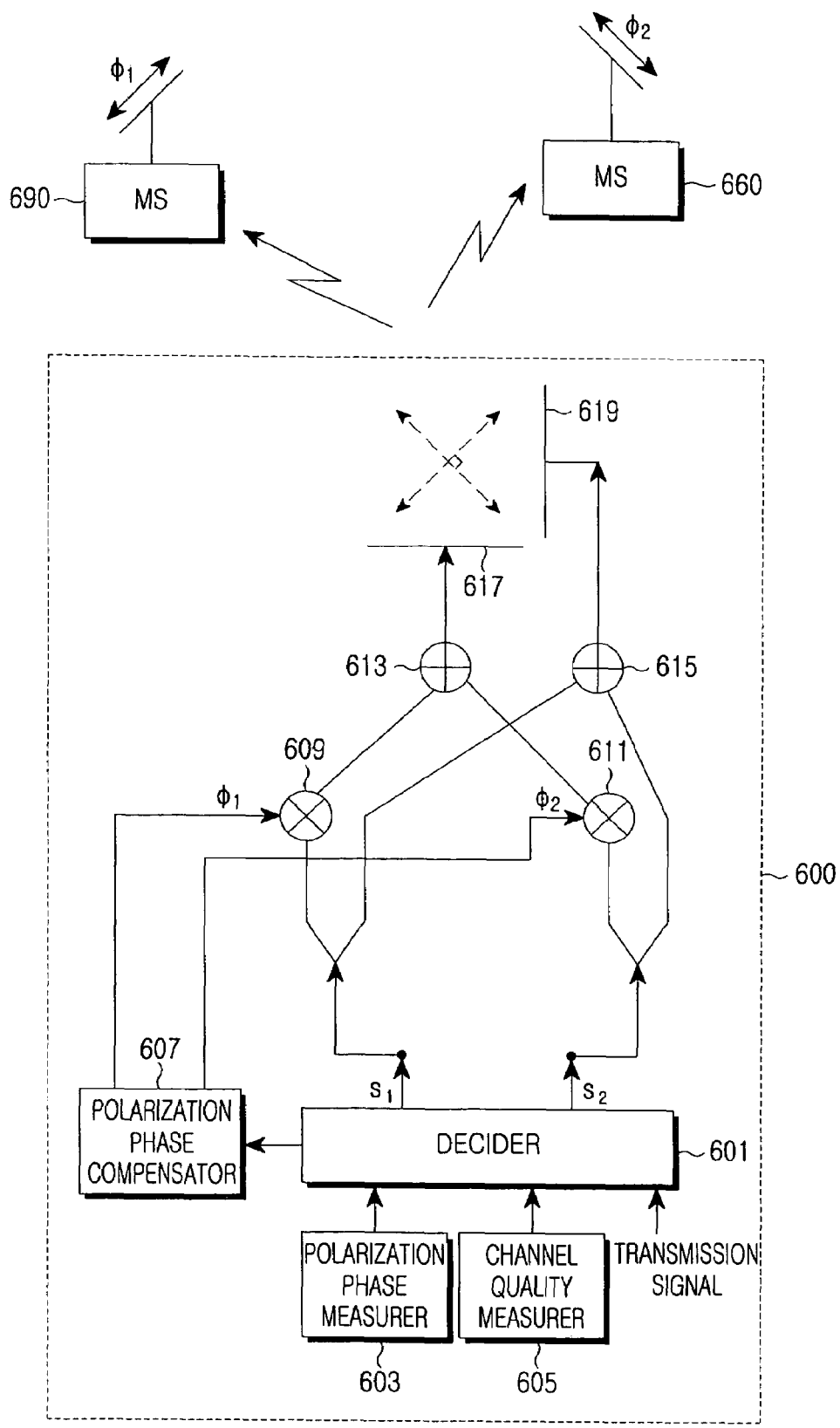
FIG. 6 is a block diagram of a signal transmitter for minimizing inter-signal interference in the wireless communication system according to the present invention.

FIG. 6 shows a signal transmitter for minimizing inter-signal interference in the wireless communication system according to the present invention. A signal transmitter 600 can be implemented in the BS. It includes a decider 601, a polarization phase measurer 603, a channel quality measurer 605, a polarization phase compensator 607, multipliers 609 and 611, adders 613 and 615, and transmit polarization antennas 617 and 619. The signal transmitter 600 communicates with MSs 660 and 690.

The polarization phase measurer 603 measures the polarization phases φ of MSs within its service area, for example, within a cell. The polarization phase measuring is performed every predetermined interval and the polarization phases are updated correspondingly.

The channel quality measurer 605 measures the channel qualities of the MSs. The channel qualities can be SNRs, CIRs, SINRs, or CINRs.

The decider 601 receives the polarization phase measurements and the channel qualities from the polarization phase measurer 603 and the channel quality measurer 605, and determines an MS group that the signal transmitter 600 will send signals based on the received information. Since the signal transmitter 600 communicates with the MSs 600 and 690 using polarization phases, it communicates with two or less MSs to reduce inter-signal interference. Thus, the MS group includes one or two MSs. The decider 601 outputs transmission signals $s_1$ and $s_2$ for the decided MS group among received transmission signals and provides information about the MSs of the MS group to the polarization phase compensator 607. How the decider 601 selects MSs to be grouped into an MS group will be described later.

The polarization phase compensator 607 may receive the polarization phase measurements directly from the phase measurer 603 or through the decider 601. The polarization phase compensator 607 compensates the polarization phases of the MS group such that inter-signal interference is minimized and outputs the compensated polarization phases $\phi_1$ and $\phi_2$ to the multipliers 609 and 611.

The multipliers 609 and 611 multiply the compensated polarization phases $\phi_1$ and $\phi_2$ by the transmission signals $s_1$ and $s_2$.

The adders 613 and 615 each combine the transmission signals or the polarization phase-compensated signals. Thus, the transmit polarization antennas 617 and 619 send the resulting transmission signals whose polarization phases have been matched by the multipliers 609 and 611, and the adders 613 and 615.

In other words, the multipliers 609 and 611, and the adders 613 and 615 collectively form a polarization phase matcher. Specifically, in the polarization phase matcher, the multipliers 609 and 611 multiply the transmission signals received from the decider 601 by the compensated polarization phases, the first adder 613 combines the signals received from the multipliers 609 and 611, and the second adder 615 combines the transmission signals received from the decider 601.

The signal from the first adder 613 is sent through the first polarization antenna 617 and the signal from the second adder 615 is sent through the second polarization antenna 619.

The decider 601 determines the MS group including one or two MSs to which the signal transmitter 600 will send signals. Assuming that three MSs M1, M2, and M3 exist within the cell, the decider 601 may consider six MS groups, {M1}, {M2}, {M3}, {M1, M2}, {M1, M3} and {M2, M3}. Then, the polarization phases of a selected one of the MS groups are compensated in the polarization phase compensator 607.

The MS grouping in the decider 601 can be considered in three ways.

In one of them, the decider 601 receives the channel qualities of the MSs and calculates the transmission capacities of the MS groups using the channel qualities. Given M1, M2 and M3 within the cell, the transmission capacity of the MS group {M1} is calculated by Equation (2)

$$\log_2\{1+SNR_1\} \quad (2)$$

where $SNR_1$ represents the SNR of M1.

The transmission capacity of the MS group {M2, M3} is calculated by Equation (3)

$$\log_2\{1+SNR_{2,3}\}+\log_2\{1+SNR_{3,2}\} \quad (3)$$

where $SNR_{i,j}$ represents the SNR of Mi in an MS group including MSi and MSj.

The decider 601 calculates the transmission capacities of the six MS groups using the channel qualities of the MSs. Then the decider 601 selects an MS group having the largest transmission capacity.

Another way is that the decider 601 receives the channel qualities of the MSs, selects a first MS having the best channel quality, and selects a second MS having a polarization phase within a predetermined polarization phase range with respect to the polarization phase of the first MS.

The polarization phase range can be set based on a polarization phase (+90 or −90 degrees) orthogonal to that of the first MS. For example, if the polarization phase of the first MS is 0 degrees and the polarization phase range covers 20 degrees, the polarization phase range is from +80 to +100 degrees for +90 degrees orthogonal to the polarization phase of the first MS, or from −80 to −100 degrees for −90 degrees orthogonal to the polarization phase of the first MS. Thus, an MS having a polarization phase falling within the polarization phase range is selected as the second MS. Yet, the second MS should have a channel quality equal to or better than a channel quality threshold. For example, the second MS should have an SNR equal to or better than an SNR threshold. If an MS below the channel quality threshold has a polarization phase within the predetermined polarization phase range, it cannot be selected as the second MS. The MS group includes only one MS having the best channel quality. If a plurality of MSs have polarization phases within the predetermined polarization phase range, an MS having the highest of SNRs equal to or higher than the SNR threshold is selected as the second MS for the MS group.

The other way is that the decider 601 selects a first MS according to a rule preset considering proportional fairness. Then a second MS is selected, which has a polarization phase within a predetermined polarization range set with respect to the polarization phase of the first MS.

The predetermined polarization phase range is set to be orthogonal to the polarization phase of the first MS. Thus, an MS having a polarization phase falling within the polarization phase range is selected as the second MS. Yet, the second MS should have a channel quality equal to or better than a channel quality threshold. For example, the second MS should have an SNR equal to or higher than an SNR threshold. If an MS below the channel quality threshold has a polarization phase within the predetermined polarization phase range, it cannot be selected as the second MS. In this case, the MS group includes only one MS having the best channel quality. If a plurality of MSs have polarization phases within the predetermined polarization phase range, the second MS is selected for the MS group, considering the predetermined polarization phase range and the channel quality threshold.

Assuming that the BS is the signal transmitter for minimizing inter-signal interference, a method of minimizing inter-signal interference according to the present invention will be described with reference to FIGS. 7, 8 and 9.

Figure 7:
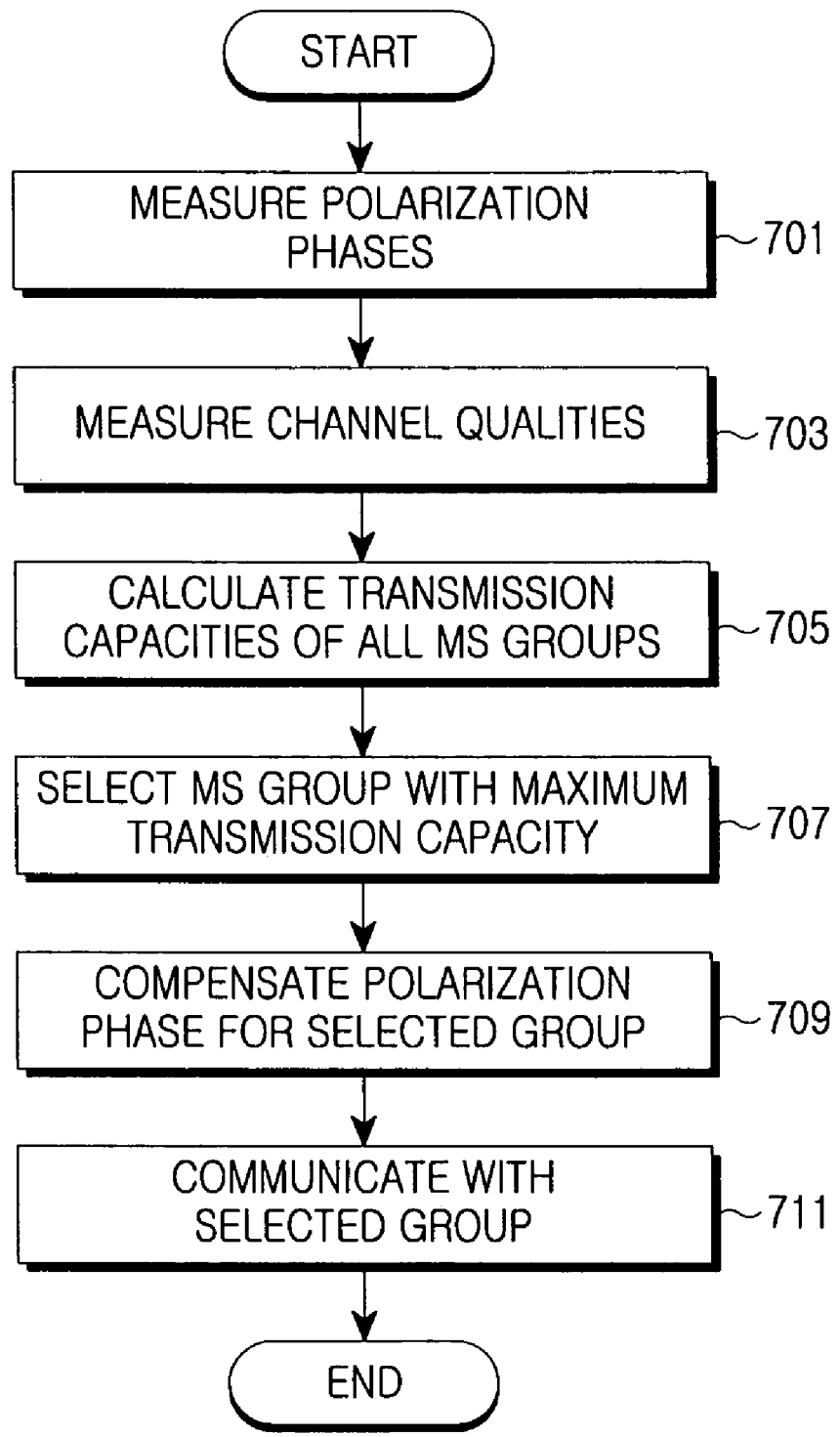
FIG. 7 is a flowchart illustrating a signal transmission operation for minimizing inter-signal interference according to the present invention.

FIG. 7 shows an example of a signal transmission operation for minimizing inter-signal interference according to the present invention. The BS measures the polarization phases of MSs in step 701. The polarization phases are not instantaneous values but the averages of polarization phases measured for a predetermined time period. The BS updates the polarization phases for every predetermined time period.

In step 703, the BS measures the channel qualities of the MSs, such as SNRs, CIRs, SINRs, or CINRs. The polarization phase measuring and the channel quality measuring may take place simultaneously, or the channel quality measuring may precede the polarization phase measuring.

The BS calculates the transmission capacities of all MS groups that can be created with the MSs within the cell area of the BS in step 705.

The BS selects an MS group having the maximum transmission capacity in the manner described with reference to FIG. 6 in step 707.

In step 709, the BS compensates the polarization phases of the MS group. The MS group may include one or two MSs and the polarization phase compensation is performed so the polarization phases of the MSs are orthogonal to each other and thus there is no mutual interference between the MSs.

The BS matches the polarization phases of transmission signals for the MSs of the MS group to compensated polarization phases and sends the polarization phase-matched transmission signal to them in step 711.

Figure 8:
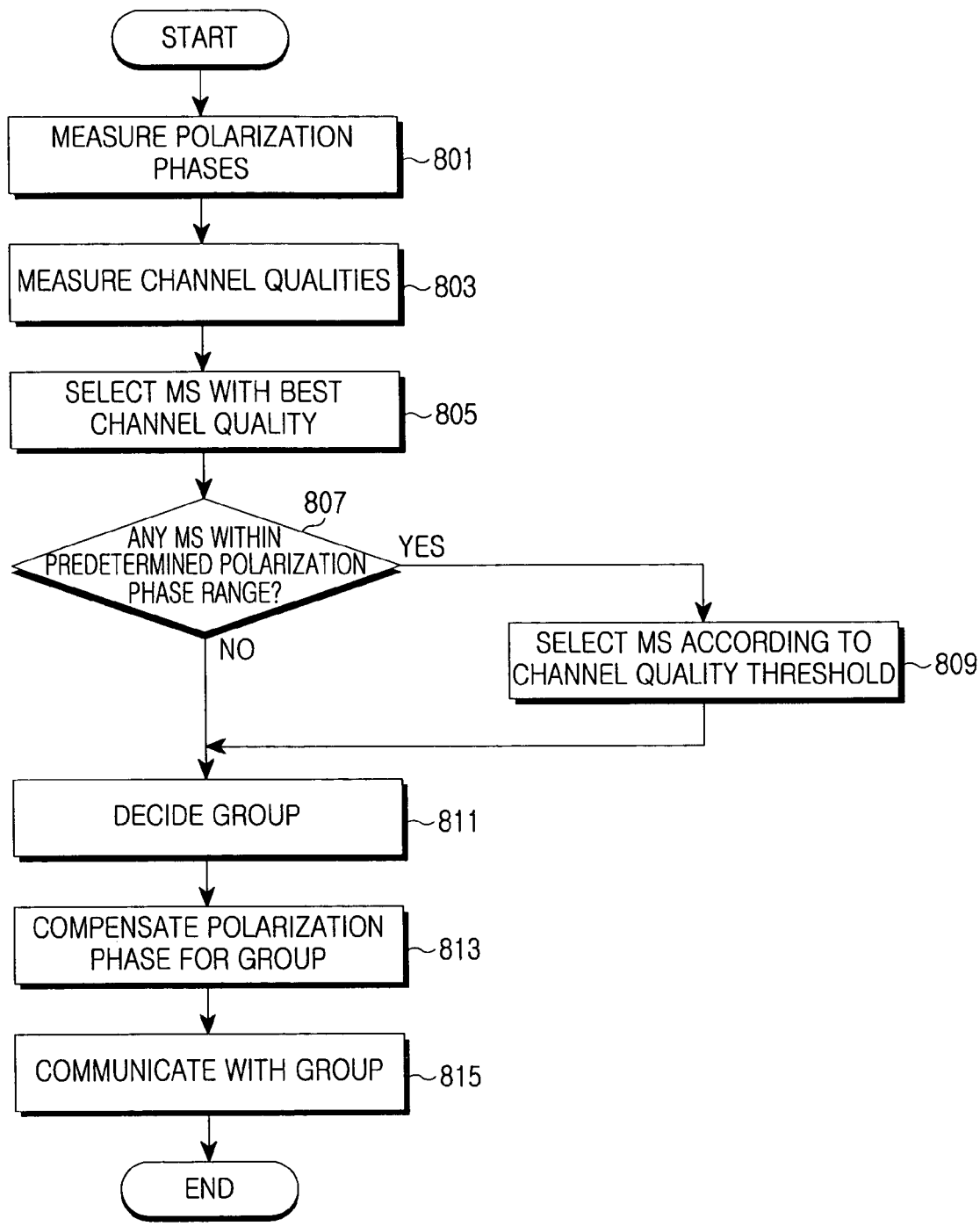
FIG. 8 is a flowchart illustrating a signal transmission operation for minimizing inter-signal interference according to the present invention.

FIG. 8 shows another example of a signal transmission operation for minimizing inter-signal interference according to of the present invention. The BS measures the polarization phases of MSs in step 801. The polarization phases are not instantaneous values but the averages of polarization phases measured for a predetermined time period. The BS updates the polarization phases for every predetermined time period.

In step 803, the BS measures the channel qualities of the MSs, such as SNRs, CIRs, SINRs, or CINRs. The polarization phase measuring and the channel quality measuring may take place simultaneously, or the channel quality measuring may precede the polarization phase measuring.

The BS selects a first MS having the best channel quality in step 805 and determines whether there is any MS with a polarization phase falling within a predetermined polarization phase in step 807. The polarization phase range is set based on a polarization phase orthogonal to that of the first MS.

In the absence of such an MS, the BS goes to step 811. In the presence of such an MS, the BS goes to step 809.

In step 809, the BS determines whether the MS has a channel quality equal to or better than a channel quality threshold, for example, an SNR threshold. If the channel quality of the MS is equal to or greater than the channel quality threshold, the BS selects the MS as a second MS to be included in an MS group. On the contrary, if the channel quality of the MS is less than the channel quality threshold, the BS does not select the MS. When a plurality of MSs have a channel quality equal to or greater than the channel quality threshold, an MS with the best channel quality among them is selected as the second MS.

In step 811, the BS determines the MS group through step 807 or step 809.

The BS performs polarization phase compensation for the determined MS group in step 813. The MS group may include one or two MSs. That is, the MS group includes only the first MS with the best channel quality or both the first and second MSs. The polarization phase compensation is carried out so the polarization phases of the MSs in the MS group are mutually orthogonal to thereby avoid inter-signal interference.

The BS matches the phases of transmission signals for the MSs of the MS group to compensated polarization phases and sends the signals in step 815.

Figure 9:
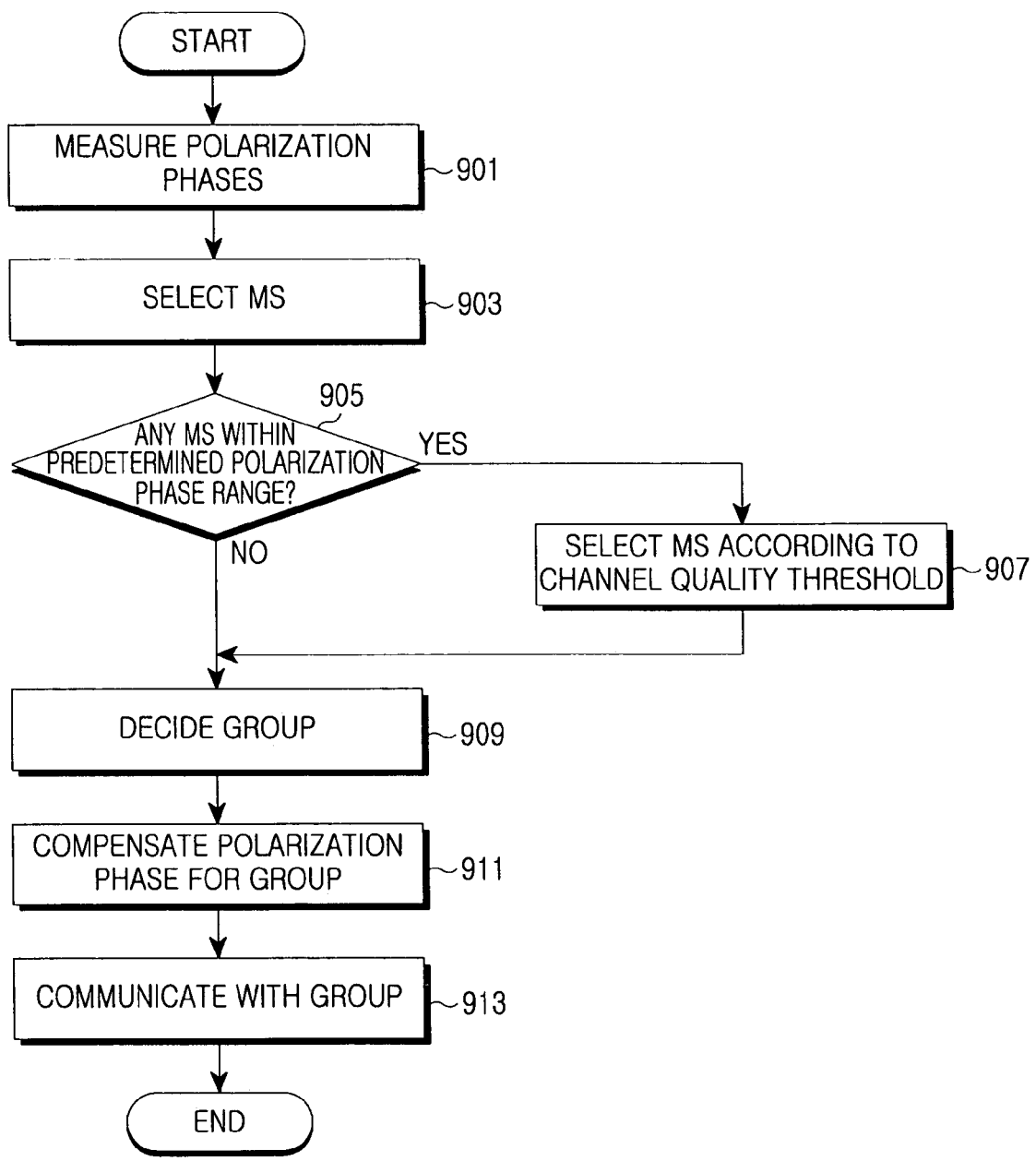
FIG. 9 is a flowchart illustrating a signal transmission operation for minimizing inter-signal interference according to the present invention.

FIG. 9 shows another example of a signal transmission operation for minimizing inter-signal interference according to the present invention. The BS measures the polarization phases of MSs in step 901. The polarization phases are not instantaneous values but the averages of polarization phases measured for a predetermined time period. The BS updates the polarization phases for every predetermined time period.

In step 903, the BS selects a first MS according to a predetermined order. The order is preset considering proportional fairness.

The BS determines whether there is any MS with a polarization phase falling within a predetermined polarization phase in step 905. In the presence of such an MS, the BS goes to step 907.

In step 907, the BS determines whether the MS has a channel quality equal to or greater than a channel quality threshold, for example, an SNR threshold. If the channel quality of the MS is equal to or greater than the channel quality threshold, the BS selects the MS as a second MS to be included in an MS group. On the contrary, if the channel quality of the MS is less than the channel quality threshold, the BS does not select the MS. When a plurality of MSs have a channel quality equal to or greater than the channel quality threshold, an MS with the best channel quality among them is selected as the second MS.

In step 909, the BS determines the MS group through step 905 or step 907.

The BS performs polarization phase compensation for the determined MS group in step 911. The MS group may include one or two MSs. That is, the MS group includes only the first MS with the best channel quality or both the first and second MSs. The polarization phase compensation is carried out so the polarization phases of the MSs in the MS group are mutually orthogonal to thereby avoid inter-signal interference.

The BS matches the phases of transmission signals for the MSs of the MS group to compensated polarization phases and sends the signals in step 913.

In accordance with the present invention as described above, in a wireless communication system, an MS group to communicate with a BS is decided according to polarization phases and channel qualities of MSs, and the polarization phases of transmission signals for the MSs of the MS group are compensated in a manner that ensures orthogonality between the MSs. Therefore, inter-signal interference is minimized during communications between the BS and the MSs. The cancellation of interference impeding signal recovery increases overall system efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of minimizing inter-signal interference in a wireless communication system, comprising the steps of:
   measuring polarization phases of Mobile Stations (MSs);
   determining an MS group having two MSs in accordance with at least the measured polarization phases of the MSs; and
   compensating a polarization phase of the MS group, matching a polarization phase of a transmission signal to the compensated polarization phase, and sending a matched-transmission signal to the MS group.

2. The method of claim 1, wherein the wireless communication system operates using a polarization phase.

3. The method of claim 1, wherein the polarization phases of the MSs are updated every predetermined interval.

4. The method of claim 1, wherein the determining an MS group step comprises:
measuring channel qualities of the MSs;
calculating transmission capacities of MS groups using the channel qualities; and
selecting an MS group with a highest transmission capacity.

5. The method of claim 4, wherein the channel qualities measuring step comprises measuring at least one of the Signal-to-Noise Ratios (SNRs), Carrier-to-Interference Ratios (CIRs), Signal-to-Interference Noise Ratios (SINRs), and Carrier-to-Interference Noise Ratios (CINRs) of the MSs.

6. The method of claim 1, wherein the determining an MS group step comprises:
measuring channel qualities of the MSs;
selecting a first MS with a best channel quality;
selecting a second MS having a polarization phase within a predetermined polarization phase range set with respect to the polarization phase of the first MS; and
grouping the selected MSs into an MS group.

7. The method of claim 6, wherein the measuring channel qualities step comprises measuring at least one of the Signal-to-Noise Ratios (SNRs), Carrier-to-Interference Ratios (CIRs), Signal-to-Interference Noise Ratios (SINRs), and Carrier-to-Interference Noise Ratios (CINRs) of the MSs.

8. The method of claim 6, wherein the selecting a second MS step comprises selecting a second MS having a channel quality greater than or equal to a channel quality threshold.

9. The method of claim 6, wherein the predetermined polarization phase range is set based on a polarization phase orthogonal to the polarization phase of the first MS.

10. The method of claim 1, wherein the MS group determining step comprises the steps of:
selecting a first MS according to a predetermined order;
selecting a second MS having a polarization phase within a predetermined polarization phase range set with respect to the polarization phase of the first MS; and
grouping the selected MSs into an MS group.

11. The method of claim 10, wherein the selecting a first MS step comprises selecting the first MS according to proportional fairness.

12. The method of claim 10, wherein the selecting a second MS step comprises selecting a second MS having a channel quality greater than or equal to a channel quality threshold.

13. The method of claim 10, wherein the predetermined polarization phase range is set based on a polarization phase orthogonal to the polarization phase of the first MS.

14. The method of claim 1, wherein the compensating a polarization phase step comprises compensating the polarization phase of at least one MS to be orthogonal to the polarization phase of another MS.

15. An apparatus for minimizing inter-signal interference in a wireless communication system, the apparatus comprising:
a polarization phase measurer for measuring the polarization phases of Mobile Stations (MSs);
a decider for determining an MS group having two MSs in accordance with at least the measured polarization phases of the MSs;
a polarization phase compensator for compensating a polarization phase of the MS group; and
a polarization phase matcher for matching a polarization phase of a transmission signal to the compensated polarization phase.

16. The apparatus of claim 15, wherein the wireless communication system operates using a polarization phase.

17. The apparatus of claim 15, wherein the polarization phase measurer updates the polarization phases of the MSs every predetermined interval.

18. The apparatus of claim 15, further comprising a channel quality measurer for measuring channel qualities of the MSs.

19. The apparatus of claim 18, wherein the channel quality measurer measures at least one of the Signal-to-Noise Ratios (SNRs), Carrier-to-Interference Ratios (CIRs), Signal-to-Interference Noise Ratios (SINRs), and Carrier-to-Interference Noise Ratios (CINRs) of the MSs.

20. The apparatus of claim 18, wherein the decider calculates transmission capacities of MS groups using the channel qualities, and selects an MS group with a highest transmission capacity.

21. The apparatus of claim 18, wherein the decider selects a first MS with a best channel quality, selects a second MS having a polarization phase within a predetermined polarization phase range set with respect to the polarization phase of the first MS, and groups the selected MSs into an MS group.

22. The apparatus of claim 21, wherein the decider selects only an MS having a channel quality equal to or greater than a channel quality threshold as the second MS.

23. The apparatus of claim 21, wherein the predetermined polarization phase range is set based on a polarization phase orthogonal to the polarization phase of the first MS.

24. The apparatus of claim 15, wherein the selector selects a first MS according to a predetermined order, selects a second MS having a polarization phase within a predetermined polarization phase range set with respect to the polarization phase of the first MS, and groups the selected MSs into an MS group.

25. The apparatus of claim 22, wherein the decider selects the first MS according to proportional fairness.

26. The apparatus of claim 22, wherein the decider selects only an MS having a channel quality greater than or equal to a channel quality threshold as the second MS.

27. The apparatus of claim 24, wherein the polarization phase range is set based on a polarization phase orthogonal to the polarization phase of the first MS.

28. The apparatus of claim 15, wherein the polarization phase compensator compensates the polarization phase of at least one MS to be orthogonal to the polarization phase of another MS.

29. The apparatus of claim 15, wherein the polarization phase matcher comprises:
a plurality of multipliers for multiplying polarization phases compensated by the polarization phase compensator by transmission signals;
a first adder for combining signals received from the multipliers and providing a combined signal to a first polarization antenna; and
a second adder for combining signals selected by the decider and providing a combined signal to a second polarization antenna.

* * * * *